(12) United States Patent
Shepodd

(10) Patent No.: US 6,706,247 B2
(45) Date of Patent: Mar. 16, 2004

(54) SELF REGULATING FORMULATIONS FOR SAFE HYDROGEN GETTERING

(75) Inventor: Timothy Jon Shepodd, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 10 days.

(21) Appl. No.: 10/313,045

(22) Filed: Dec. 6, 2002

(65) Prior Publication Data

US 2003/0125196 A1 Jul. 3, 2003

Related U.S. Application Data

(62) Division of application No. 09/896,728, filed on Jun. 29, 2001, now Pat. No. 6,491,844.

(51) Int. Cl.[7] .............................. H01J 7/18; H01J 35/20
(52) U.S. Cl. ................. 423/248; 252/181.6; 252/181.1; 252/184; 252/181.2; 252/182.29; 252/182.33; 502/159; 44/275
(58) Field of Search ...................... 252/181.6, 181.1, 252/184, 181.2, 182.29, 182.33; 502/159; 423/248; 44/275

(56) References Cited

U.S. PATENT DOCUMENTS

| | | | | |
|---|---|---|---|---|
| 3,613,658 A | * | 10/1971 | Knowles et al. | 44/275 |
| 3,615,914 A | * | 10/1971 | Becker et al. | 148/101 |
| 3,896,042 A | * | 7/1975 | Anderson et al. | 252/184 |
| 3,963,826 A | * | 6/1976 | Anderson et al. | 423/248 |
| 4,097,774 A | * | 6/1978 | Cosco et al. | 313/558 |
| 4,171,350 A | * | 10/1979 | Sanders | 423/580.1 |
| 4,614,674 A | * | 9/1986 | Lauterbach | 427/386 |
| 4,744,943 A | * | 5/1988 | Timm | 419/10 |
| 4,886,048 A | * | 12/1989 | Labaton et al. | 165/104.27 |
| 4,886,637 A | * | 12/1989 | Jandeska et al. | 419/12 |
| 4,910,246 A | * | 3/1990 | Burba et al. | 524/399 |
| 5,002,682 A | * | 3/1991 | Bragg et al. | 510/311 |
| 5,298,556 A | * | 3/1994 | Stephens | 524/860 |
| 5,624,598 A | * | 4/1997 | Shepodd et al. | 252/182.12 |
| 5,681,783 A | * | 10/1997 | Nilsson et al. | 501/87 |
| 5,703,378 A | * | 12/1997 | Shepodd et al. | 252/182.12 |
| 5,837,158 A | * | 11/1998 | Shepodd et al. | 252/181.6 |
| 5,998,325 A | * | 12/1999 | Shepodd | 502/151 |
| 6,063,307 A | * | 5/2000 | Shepodd et al. | 252/181.6 |
| 6,110,397 A | * | 8/2000 | Shepodd et al. | 252/181.6 |
| 6,165,234 A | * | 12/2000 | Kanakkanatt | 44/275 |
| 6,294,498 B1 | * | 9/2001 | Darcissac et al. | 502/159 |

* cited by examiner

*Primary Examiner*—Joseph D. Anthony
(74) *Attorney, Agent, or Firm*—Timothy P. Evans

(57) ABSTRACT

A method and composition are disclosed for preventing uncontrolled exothermic reaction in the presence of a catalyst. A catalyst deployed as a finely divided powder which is attached to the surface of a low melting point wax or wax-like material which is utilized as a carrier for the catalyst. During operation should the catalyst overheat due to uncontrolled conditions brought about by a run-away reaction the heat of reaction melts the low melting point wax which would itself wet the surface of the catalyst and prevent further catalysis.

6 Claims, 2 Drawing Sheets

SELF REGULATING FORMULATIONS FOR SAFE HYDROGEN GETTERING

CROSS REFERENCE TO RELATED APPLICATIONS

This application is a division of U.S. patent application Ser. No. 09/896,728 originally filed Jun. 29, 2001 now U.S. Pat. No. 6,491,844 entitled "SELF REGULATING FORMULATION FOR SAFE HYDROGEN GETTERING," from which priority is claimed.

STATEMENT OF GOVERNMENT INTEREST

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

This invention pertains generally to methods and formulations for stopping or severely restricting a catalytic reaction between hydrogen and oxygen within enclosed spaces wherein the mixture of hydrogen and oxygen is within an explosive range. In particular, the invention pertains to a material formulation comprising a hydrogen getter and an inert low melting point agent which when heated will melt and wet the surface of the getter and thereby terminate the catalytic reaction before that reaction reaches the auto-ignition temperature of hydrogen.

Hydrogen can be produced from corrosion of metals by atmospheric gases or electric currents; from batteries, and sealed electronic devices operating in normal or abnormal conditions. In particular, the generation and accumulation of hydrogen in these devices can, and frequently does, become a safety hazard. For instance portable lighting devices such as sealed lanterns and flashlights which employ batteries having aqueous electrolytes, must provide a means for safely eliminating hydrogen generated as the result of electrochemical reactions, charging, excessive discharge, or inadvertent battery reversal, etc.

Of particular concern, is the presence of both hydrogen and oxygen because of the potential for an explosion due to a static electric discharge or a spark in the presence of a noble metal hydrogenation catalyst. It will be appreciated by those skilled in the art, that the reaction between hydrogen and oxygen in the presence of a hydrogenation catalyst is rapid and exothermic and over a wide range of concentrations can be explosive because the catalyst temperature can rise from the heat of reaction above the ignition temperature of the mixture of hydrogen and oxygen gases.

It has long been known that hydrogen scavenging materials, known as "getters," can be used to counteract hydrogen accumulation. Ayers et al. (U.S. Pat. No. 4,512,721) discusses the use of active metals such as zirconium and titanium, and alloys thereof. These metals are capable of maintaining low hydrogen partial pressures but have the disadvantage of requiring high temperatures for initial activation and/or ongoing operation because of the necessity to diffuse surface contaminants into the bulk metal thereby providing a fresh surface for continued hydrogen absorption.

It is also well known in the art that unsaturated carbon-carbon bonds (i.e., double or triple bonds between carbon atoms) can be reduced by hydrogen and its isotopes in the presence of an appropriate catalyst to form an alkane; see, for example, Fieser, L. F. and Fieser, M., *Textbook of Organic Chemistry*, D. C. Heath & Co. 1950, pp. 66–69 and 86. Additionally, Anderson et al., (U.S. Pat. Nos. 3,896,042 and 3,963,826) and Harrah et al., (U.S. Pat. No. 4,405,487) disclose the use of solid acetylenic compounds (i.e., organic compounds having carbon-carbon triple bonds) combined with various Group VIII metal catalysts to irreversibly remove hydrogen over the temperature range −50° C. to 110° C. Shepodd et al. (U.S. Pat. Nos. 5,624,598, 5,703,378, 5,837,158 and 6,063,307) disclose other compositions of unsaturated organic compounds and noble metal catalysts, particularly Pd, suitable for gettering hydrogen under a variety of conditions.

Finally, Labaton, (U.S. Pat. No. 4,886,048), describes another means for removing hydrogen by reacting the hydrogen with oxygen in the presence of a noble metal catalyst, such as palladium, to form water and then trapping the water on a water absorbing material such as a molecular sieve; and Shepodd, et al. (U.S. Pat. No. 5,998,325), disclose a hydrogen getter composition suitable for use in gaseous mixtures of hydrogen and oxygen within the explosive range, wherein the hydrogen and oxygen are catalyzed to form water vapor.

Under most normal operating conditions hydrogen getters of the type described by Shepodd, above ('325), operate effectively and without need for emergency intervention. However, in order to protect a user in situations where the hydrogen getter becomes dangerously overheated there is a need for a means to safely remove hydrogen from an atmosphere which contains oxygen without the danger of explosion. The present invention provides a means for restricting the catalyzed reaction between hydrogen and oxygen from proceeding so rapidly as to accelerate out of control: to begin to "run-away."

SUMMARY OF THE INVENTION

Certain consumer products such as sealed lanterns, flash lights, and the like, which rely on alkaline cells to provide power, can produce and retain hydrogen gas when the device is used and the electrical cells are discharged. Since these devices must also necessarily include an electrical switch, which may act as a spark source, these devices have been designed to incorporate a hydrogen getter pellet to safely remove the hydrogen gas. Unfortunately, such designs require making certain assumptions regarding the level of probable hydrogen generation which sometimes dictate increasing the concentration of these catalysts in order to increase the reaction rates of the hydrogen when the ambient concentrations of hydrogen are low. However, in certain circumstances there may exist a high probability that the getter pellet will be exposed to large quantities of hydrogen, such as during a cell short-circuit or reversal. In these cases such formulae can become increasing hot in the presence of higher concentrations of hydrogen and can thus present a "run-away" hazard; that is, a situation in which the catalysis reaction begins to accelerate uncontrollably and causing the surface temperature of the getter to increase so quickly such that the system is unable to disperse the heat of reaction will lead to the potential for an ignition to occur. Such scenarios can and have lead to catalyst surface temperatures exceeding the auto-ignition temperature of hydrogen when a sufficient concentration of oxygen is also present. Such devices, therefore, are deemed to pose an imminent hazard if oxygen is also present in any significant quantity.

Given that there is a desire on the part of a manufacturer to provide a product which can be safely operated under even the most extreme abuse, for those products or devices which incorporate a hydrogen getter to consume spurious hydrogen gas generated during device operation, it would be desirable to provide a means for moderating that reaction so as to prevent the getter from generating excessive amounts of heat and getting hot. This is especially desirable in instances where the atmosphere into which the hydrogen evolves also contains a significant fraction of oxygen.

It is therefore an object of this invention to provide a getter composition which includes a heat-activated sacrificial material intended to greatly slow gettering above a chosen temperature. In particular, it is an object of this invention to provide a wax, or similar material, for compounding with a getter powder which would melt, wet, and coat the getter powder at a predetermined temperature and thereby greatly reduce the effective getter surface available for reaction.

BRIEF DESCRIPTION OF THE DRAWINGS

FIG. 1A shown the electrical switch in an open position, while FIG. 1B shows the switch closed.

DETAILED DESCRIPTION OF THE INVENTION

Figure 1A:
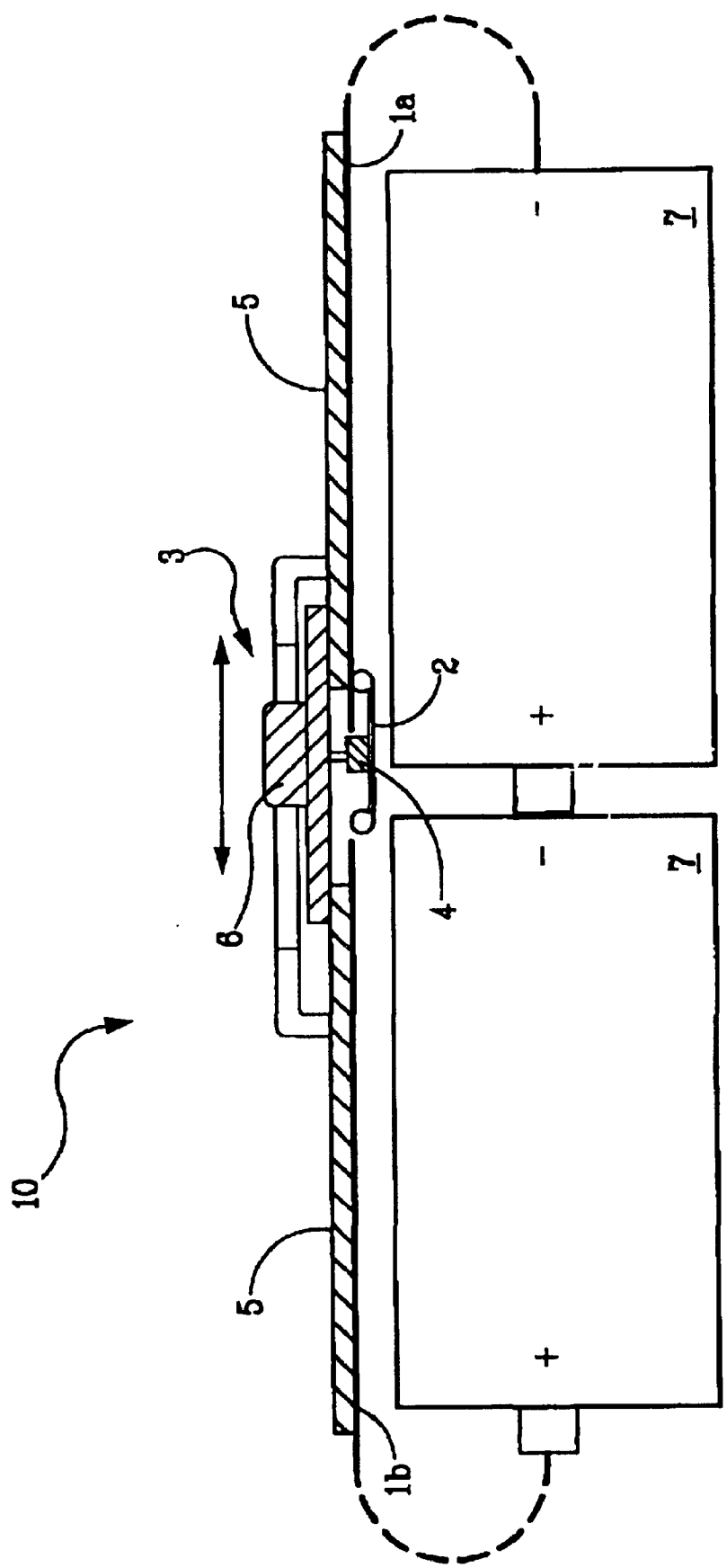
FIGS. 1A and 1B show a schematic of an electrical switch assembly which might be found typically in simple battery driven devices such as commercial lanterns or flashlights. The drawings show the placement of a hydrogen getter pellet of the present invention.

The present invention discloses a composition and method for terminating, or substantially restricting, an uncontrolled catalytic reaction. The disclosed method and composition apply to a dispersed catalyst material at which an exothermic reaction would occur. The particular circumstance addressed in the present invention is that of the uncontrolled reaction of hydrogen and oxygen at the surface of a catalytic getter material, such as might occur due to accumulation of hydrogen in a small sealed volume, where the explosive limit is or could be exceeded. In such circumstances the potential for personal injury due to fire and/or detonation of the gas mixture is significant.

The present invention, therefore, is intended to terminate uncontrolled catalysis. However, while directed to limiting the uncontrolled reaction of hydrogen and oxygen, those skilled in the art will recognize that the method finds application wherever there exists the potential for an uncontrolled, heat-generating reaction taking place at the surface of a dispersed media.

Catalysts which will remove hydrogen from an environment are known and are known to operate along one of two routes: either through direct oxidation with $O_2$ to form water vapor as described and disclosed in commonly owned U.S. Pat. No. 5,998,325, herein incorporated by reference, or through hydrogenating an unsaturated carbon-carbon bond as described and disclosed in commonly owned U.S. Pat. Nos. 5,624,598, 5,703,378, 5,837,158, and 6,063,307, herein incorporated by reference. In either case the catalyst comprises one or more of the metals listed in New IUPAC Groups 8–10 of the Periodic Table of Elements and rhenium, particularly platinum, palladium, and rhodium, and alloys of each. In the case where hydrogen is removed though hydrogenation the above catalyst formulations would further comprise an organic polymer having repeating monomer units having at least one carbon-carbon double or triple bond.

It will be appreciated that hydrogen and oxygen can form explosive mixtures over a concentration range of about 6 vol % to about 70 vol % $H_2$. A high temperature source such as a spark can initiate an explosive reaction of this gas mixture. Noble metal hydrogenation catalysts, especially when heated can also initiate ignition of a hydrogen/oxygen gas mixture within the explosive concentration range. Two reactions occur simultaneously during the course of hydrogenating the unsaturated bonds in an organic polymer in the presence of oxygen. One is the combination of hydrogen and oxygen in the presence of a catalyst to make water. The second is the hydrogenation of the carbon-carbon double bonds in the polymer. The generation of heat, with the consequential heating of surrounding materials, occurs when hydrogen and oxygen combine rapidly and exothermically in the presence of a catalyst and as a consequence of the hydrogenation of the unsaturated carbon-carbon bonds in a organic polymer molecule. If a means to control the reaction rate is not provided, such as that described in the present invention, detonation of the hydrogen/oxygen mixture can take place.

This invention, therefore, provides a means for preventing an uncontrolled exothermic reaction by providing a material which if melted will coat the surface of a catalyst material and substantially prevent further catalysis by providing a permeation barrier and reducing available surface area. A composition comprising a wax compound blended with a getter powder, is thus disclosed which achieves this result.

In particular, it is suggested that a loose hydrogen getter powder would be held together as a molded mass, a tablet for instance, by the binding action of a small quantity of a natural or synthetic wax. Since these waxes have the property of relatively low melting at temperatures, typically below 100° C., and, more particularly between about 40° C. and 85° C., and because they also exhibit low viscosities above their melting points, these materials could function as a safety trigger to prevent or cut-off a run-away catalytic reaction. This would be provided as follows: a quantity of wax would be used to support and hold a hydrogenation catalyst powder on the surface of a generally compact mass somewhere within a confined space.

A suitable composition for removing hydrogen from a hydrogen/oxygen mixture, wherein the concentrations of hydrogen and oxygen can be within the explosive range, is between about 1–95 wt %, preferably between 1–30 wt %, of a hydrogenation catalyst as disclosed and described in commonly owned U.S. Pat. Nos. 5,624,598 and 5,837,158, preferably between 1–10 wt % Pd dispersed on an inert medium, such as carbon or alumina, barium carbonate consolidated into a wax tablet, within a restricted volume in order to ease assembly and placement and to conserve space within the intended device.) Under normal operating conditions the consolidated catalyst functions to remove hydrogen from the confined space and remains intact. Under uncontrolled conditions, however, the heat generated by the catalysis reaction causes the surface temperature of the pellet to exceed the melting point of the wax. As the wax melts it tends to coat the catalyst powder and thus moderates further catalytic reaction by reducing the surface area of the catalyst available to participate in the reaction. In addition, in order to continue the reaction process the reacting gases would necessarily need to penetrate the overlaying layer of wax. In any case catalysis is greatly reduced which in turn reduces the potential for localized accumulation heat and minimizing the potential for explosion.

Careful review of the common natural and synthetic class of wax will also allow the designer to choose only those waxes which exhibit no discernable, or at least a very high, flash point (e.g. fl. pt.>200° C.). The common vegetable waxes in this category are bayberry, cotton, and sugar cane (no fl. pt.), hydrogenated castor oil (fl. pt.>300° C.), carnauba and ouricuri palm waxes (fl. pt.>250° C.); and candelilla and Japanese sumac (fl. pt.≧200° C.); animal waxes such as Chinese insect, refined lanolin, and shellac (no fl. pt.), and beeswax and spermaceti (fl. pt.≧240° C.); mineral waxes including ceresin, ozocerite, and moutan lignite (no fl. pt.); and synthetic waxes such as paraffin, polyethylene and polyethylene glycol (fl. pt.>200° C.). Each of these foregoing exhibits its own individual melting point ranging from about 40° C. as in the case of lanolin and polyethylene glycol (PEG), to about 100° C. in the case of polyethylene waxes. Most of the remaining substances, however, exhibit melting points which fall between about 60° C. to 85° C. The catalyst of the present invention therefore could be compounded to incorporate one or more of the above waxes to provide a body having any desired melting point across the recited range.

For example, the catalyst pellet would be prepared by dry blending about 1 gram of polymer hydrogen getter such as described in either of U.S. Pat. Nos. 5,624,598 or 5,837,158, with about 2 to 5 grams of ozocerite (for example) provided as loose granules (generally about 1 mm in diameter or about +16 US Screen Mesh) thereby working the catalyst and wax together in order to incorporate the catalyst powder onto the surface of the wax granules. After blending in this manner the mixture is either compacted into a pellet or extruded as a rod and sliced into disks or rolled into sheets and cut or punched into any shape desired. The blended granules or extruded disks would be deployed in the container porous to the gas being gettered while the cut or punched sheets could be formed into articles designed to occupy a zone along an interior surface of the device needing protection.

Alternatively, a similar quantity of the PdlC catalyst would be incorporated with 2 to 5 grams of shellac, provided as a dry powder similar in size to that of the catalyst powder. The dry powders would be blended as before, although in this case the aim is to provide a uniformly mixed aggregate rather than to simply coat the surface of the wax particles. Consolidation is performed by mechanical compaction under high pressure, into a dry pellet. Alternately, the blended shellac/catalyst powders may be dispersed and suspended into a small quantity of a suitable carrier liquid to provide a "paint" which can be easily coated into interior surfaces. This approach only works, of course, provided that the wax granules are not soluble in the carrier media.

Figure 1B:
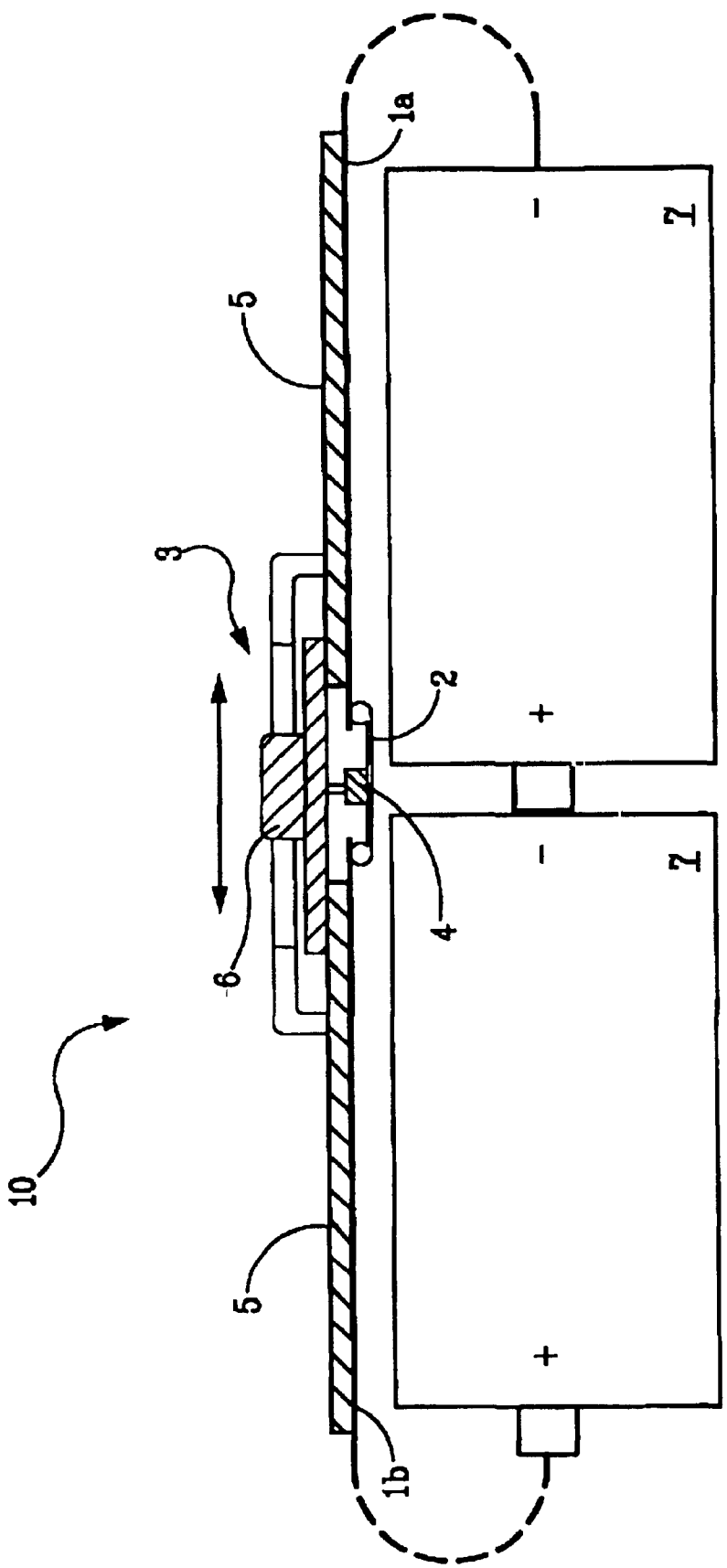

Finally, the utility and deployment of the present invention may better be appreciated by referring now to the schematic of the interior of a device 10, such as a flashlight or lantern as shown in FIGS. 1A and 1B. These devices typically comprise a housing shell 5 which includes electrical conduction means such a strips 1a and 1b of copper sheet running along a portion of the interior of shell 5. Also included is switch 3 which itself includes knob 6 attached to bridging means 2 for bridging each of the conducting strips 1a and 1b. Included between the underside of knob 6 and bridging means 2 is pellet 4 of the formulation of the present invention. Alternatively the pellets 4 could be stored in, and attached to, the underside of knob 6; stored behind, for instance, the end one of cells 7 (since these are usually forced together and against a terminal attached to the lantern or flashlight lamp, by means of a conducting spring), or in a separate chamber (not shown) placed along the inside wall of housing shell 5.

What is claimed is:

1. A method for preventing uncontrolled exothermic catalysis of hydrogen gas in ambient air, comprising the steps of:

providing a finely divided powder of a catalyst composite, said catalyst composite powder comprising a catalyst metal dispersed on the surface of an inert porous substrate material, said catalyst metal selected from the group of elements from the Periodic Table of Elements consisting of New IUPAC Groups 8–10, rhenium, and combinations and alloys thereof;

fixing a first quantity of said catalyst composite powder into one or more pieces of a wax or wax-like material, wherein said wax or wax-like material has a melting point between about 60° C. and 100° C.;

exposing said catalyst composite powder to a source of hydrogen gas, wherein a catalytic reaction is initiated between oxygen in said ambient air and said hydrogen gas at said catalyst composite powder, said catalytic reaction elevating the temperature of said catalyst composite powder and causing a portion of said wax or wax-like material to melt locally as the temperature of said catalyst composite powder exceeds said melting point; and forming a permeation barrier around said catalyst composite powder by coating said catalyst composite powder with a quantity of said melted wax or wax-like material.

2. The method of claim 1, wherein said wax or wax-like material has a flash point above at least 200° C.

3. The method of claim 1, wherein the wax or wax-like material is selected from the group consisting of bayberry, candelilla, carnauba, hydrogenated castor oil, cotton, esparto, sumac, ouricuri, sugar cane, beeswax, Chinese insect, lanolin, shellac, spermaceti, ceresin, ozocerite, moutan lignite, paraffin, microcrystalline petroleum wax, polyethylene, and polyethylene glycol, and combinations thereof.

4. The method of claim 1, wherein the inert porous substrate is selected from the list consisting of activated carbon, alumina, and barium carbonate and combinations thereof.

5. The method of claim 4, wherein the catalyst composite further comprises a long chain unsaturated organic polymer wherein said organic polymer consists of one or more repeating monomer units having at least one double or triple carbon-carbon bond.

6. The method of claim 1, wherein the catalyst metal is platinum, palladium, or rhodium.

\* \* \* \* \*